United States Patent
Tanikoshi

[11] 3,900,780
[45] Aug. 19, 1975

[54] CONTROL CIRCUIT FOR ELECTRIC MOTORS

[75] Inventor: Kinzi Tanikoshi, Tokyo, Japan

[73] Assignees: Canon Kabushiki Kaisha; Canon Seiki Kabushiki Kaisha, both of Tokyo, Japan

[22] Filed: Feb. 5, 1973

[21] Appl. No.: 329,843

[30] Foreign Application Priority Data
Feb. 3, 1972 Japan ............... 47-12409

[52] U.S. Cl. .......... 318/254; 318/138; 318/439
[51] Int. Cl. ........................... H02k 29/00
[58] Field of Search ......... 318/138, 254, 439, 696, 318/685

[56] References Cited
UNITED STATES PATENTS

| | | | |
|---|---|---|---|
| 3,127,548 | 3/1964 | Van Emden | 318/138 |
| 3,453,514 | 7/1969 | Rakes et al. | 318/254 |
| 3,585,474 | 6/1971 | Kobayashi | 318/254 |
| 3,667,018 | 5/1972 | Rakes | 318/254 |
| 3,714,532 | 1/1973 | McCurry | 318/254 |
| 3,719,870 | 3/1973 | Bregeault | 318/254 |
| 3,719,875 | 3/1973 | Holland | 318/254 |
| 3,745,435 | 7/1973 | Futagawa | 318/254 |
| 3,760,392 | 9/1973 | Stich | 318/254 |
| 3,767,986 | 10/1973 | Wada | 318/254 |

*Primary Examiner*—G. R. Simmons
*Attorney, Agent, or Firm*—Fitzpatrick, Cella, Harper & Scinto

[57] ABSTRACT

A control circuit for an electric motor having a plurality of driving coils and rotor driven by each coil is disclosed. The control circuit is provided with a plurality of switching means connected to respective driving coils. Means for generating control signal representative of the rotation of said rotor is connected to at least one of said switching means. Means for connecting said generating means to said switching means is provided so as to turn on one of said switching means and turn off the other of said switching means.

12 Claims, 15 Drawing Figures

FIG. 1A
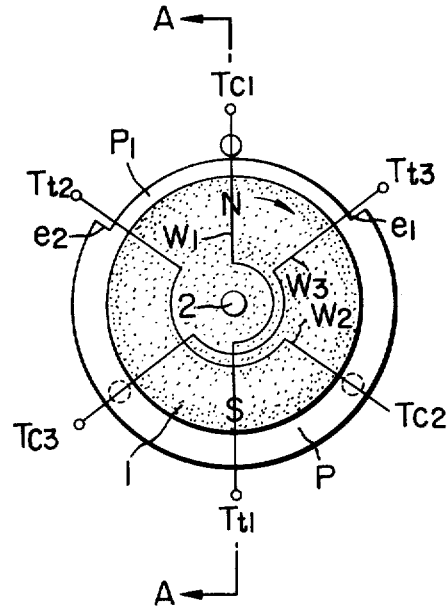
FIG. 1B
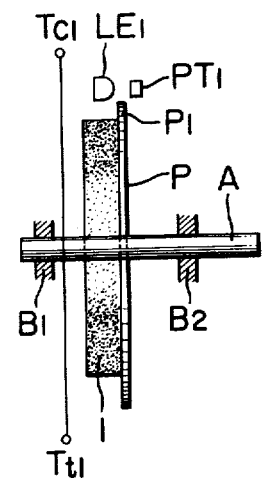
FIG. 2 — PRIOR ART
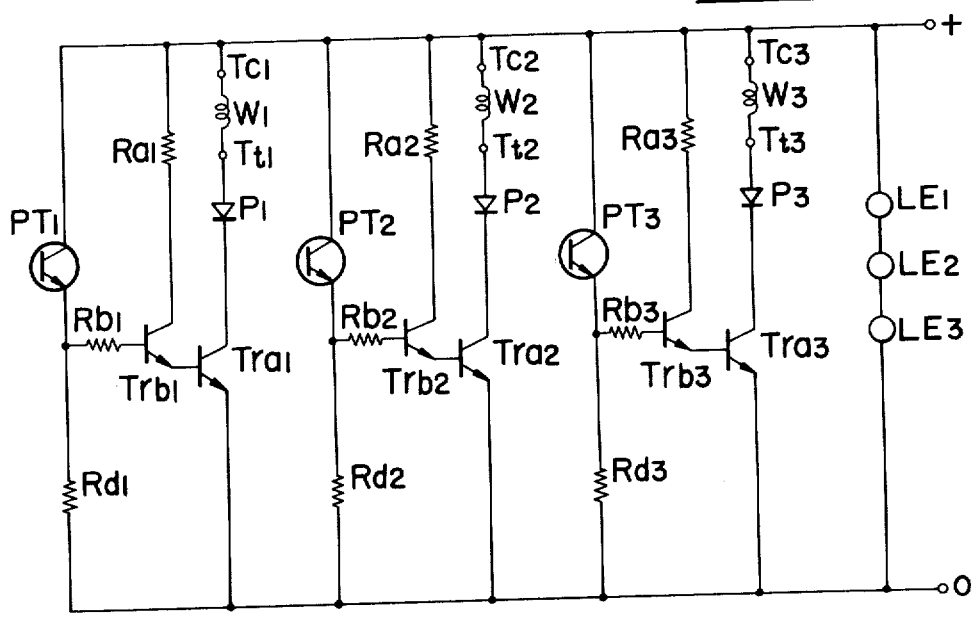

CONTROL CIRCUIT FOR ELECTRIC MOTORS

BACKGROUND OF THE INVENTION

In the conventional DC motors metallic commutators or brushes are used in order to reverse the driving current flowing through rotating coils so that the conventional DC motors have the problems of short service life, noises and so on all caused from the brushes. Therefore the so-called brushless DC motors having no brush have been widely used.

In the most common brushless DC motors a rotor is generally made of a permanent magnet and the sequential energizations of the driving coils are controlled in response to the angular position of the rotor. The conventional brushless DC motor comprises a disk-shaped rotary magnet rotatably supported by a shaft which in turn is supported by a pair of brackets, and a light-shielding disk mounted upon the rotary magnet coaxially thereof in order to control the sequential energizations of driving coils, wherein along the both sides of the path of the notched portion of the light shielding disk are disposed the light sources such as lamps or electroluminescent diodes and the photoelectric elements such as photodiodes in opposed relation, respectively. In such conventional brushless DC motor, in case of the three-phase driving, the angle of the notched portion of the disk is so selected as to be slightly in excess of 120° so that the rotary magnet may be started from any angular position. Therefore the sum of the driving currents impressed to the driving coils becomes the pulse-shaped currents. That is, when the driving currents flow into the driving coils sequentially the pulse-shaped currents are also applied to them. As a result the torque of the rotary magnet is caused to pulsate. This pulsation in torque brings about the serious problems to the high-precision DC motors which are required to rotate at a uniform speed with uniform torque. In other words the conventional brushless DC motors cannot satisfy such requirements as a uniform speed and a uniform torque.

SUMMARY OF THE INVENTION

The present invention was made in order to eliminate the defects described above, and is characterized in that the energization of one driving coil is further controlled depending upon whether other driving coils are energized or not so that the pulsation in torque caused when the energizations of the driving coils are switched may be completely eliminated.

The objects, features and advantages of the present invention will become more apparent from the following description of some preferred embodiments thereof taken in conjunction with the accompanying drawings.

BRIEF DESCRIPTION OF THE DRAWINGS

FIGS. 1(A) and 1(B) are front and side views of the conventional brushless DC motor;

FIG. 2 is a diagram of a conventional electronic control circuit for use to motor shown in FIG. 1;

DETAILED DESCRIPTION OF THE PREFERRED EMBODIMENTS

Figure 3:
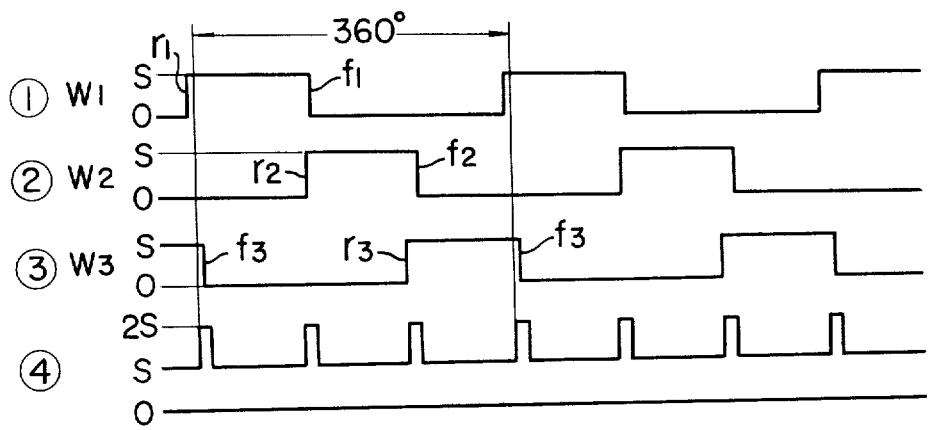
FIG. 3 illustrates the wave forms used for the explanation thereof.

Same reference numerals are used to designate similar component parts throughout the figures.

In the most common brushless DC motors a rotor is generally made of a permanent magnet and the sequential energizations of the driving coils are controlled in response to the angular position of the rotor. In the conventional brushless DC motor of the type shown in FIGS. 1(A) and 1(B), a disk-shaped rotary magnet 1 is rotatably supported by a shaft 2 which in turn is supported by a pair of brackets $B_1$ and $B_2$ and a light-shielding disk P is mounted upon the rotary magnet 1 coaxially thereof in order to control the sequential energizations of driving coils. Along the both sides of the path of the notched portion $P_1$ of the light shielding disk P are disposed the light sources $LE_1$, $LE_2$ and $LE_3$ such as lamps or electroluminescent diodes and the photoelectric elements $PT_1$, $PT_2$ and $PT_3$ such as photodiodes in opposed relation, respectively. The driving coils $W_1$, $W_2$ and $W_3$ having the terminals $T_{c1}$ and $T_{t1}$, $T_{c2}$ and $T_{t2}$ and $T_{c3}$ and $T_{t3}$ are mounted upon the rotary 1 and electrically connected to the collector circuits of transistors $Tra_1$, $Tra_2$ and $Tra_3$ in an electronic circuit shown in FIG. 2. The conduction of the transistors $Tra_1$, $Tra_2$, and $Tra_3$ is controlled through transistors $Trb_1$, $Trb_2$, and $Trb_3$ by the signals from the photoelectric elements $PT_1$, $PT_2$ and $PT_3$. In the angular position of the rotary magnet 1 shown in FIG. 1(A) the light from the light source $LE_1$ is intercepted by the photoelectric elements $PT_1$ so that the transistors $Trb_1$ and $Tra_1$ are conducted. As a result the driving current as shown at①in FIG. 4(B) flows through the driving coil $W_1$ so that the rotation of the rotary magnet 1 is started. When the light-shielding disk P interrupts the light beam from the light source $LE_1$ to the photoelectric element $PT_1$ as the notched portion $P_1$ rotates the supply of the driving current to the driving coil $W_1$ is interrupted as shown at①$f_1$ in FIG. 3, but the driving current flows through the driving coil $W_2$ as shown at②$r_2$ in FIG. 3 because the notched portion $P_1$ of the disk P moves between the light source $LE_2$ and the photoelectric element $PT_2$ so that the transistors $Tra_2$ and $Trb_2$ are conducted. Therefore the rotary magnet 1 is continuously driven. In case of the three-phase driving coils as shown in FIG. 1 (A) the angle of the notched portion $P_1$ of the disk P is so selected as to be slightly in excess of 120° so that the rotary magnet 1 may be started from any angular position. Therefore the sum of the driving currents impressed to the driving coils $W_1$ and $W_2$ becomes as shown at 4 in FIG. 3. That is, when the driving currents flow into the driving coils sequentially the pulse-shaped currents are also applied to them. As a result the torque of the rotary magnet 1 is caused to pulsate. This pulsation in torque brings about the serious problems to the high-precision DC motors which are required to rotate at a uniform speed with uniform torque. In other words the conventional brushless DC motors cannot satisfy such requirements as a uniform speed and a uniform torque.

Figure 4:
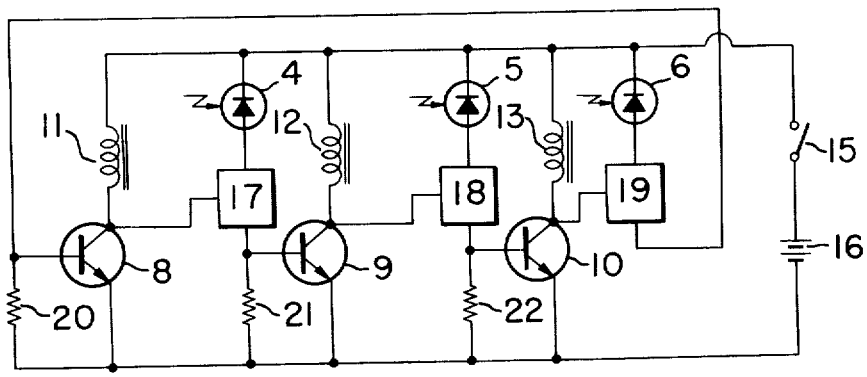
FIG. 4(A) is a diagram of a first embodiment of an electronic control circuit for brushless DC motors in accordance with the present invention.
FIG. 4(B) illustrates the waveforms used for the explanation of the mode of operation thereof.
Figure 4:
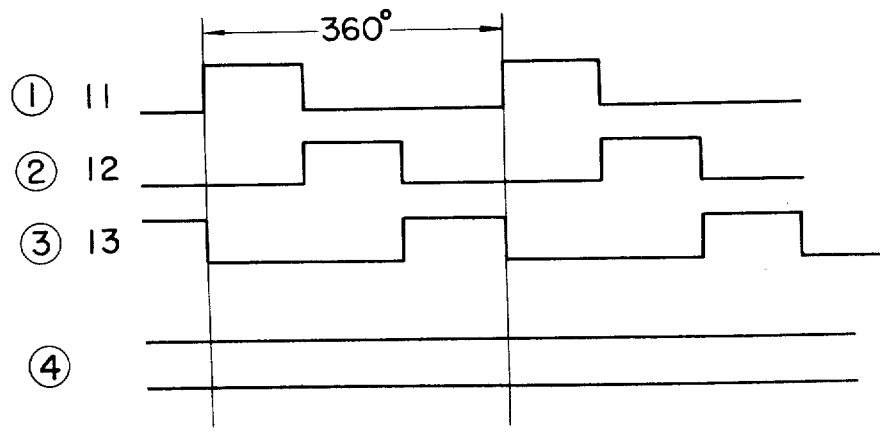

Referring to FIG. 4(A), reference numerals 4, 5 and 6 designate photodiodes which correspond to the photoelectric elements $PT_1$, $PT_2$ and $PT_3$ shown in FIG. 1(A) and intercept the light beams from the light sources through the notched portion $P_1$ of the light shielding disk P which rotates in unison with the rotary magnet. 8, 9 and 10 are n-p-n transistors to the collector circuits of which are connected coils 11, 12 and 13 which correspond to the driving coils $W_1$, $W_2$ and $W_3$ shown in FIG. 1(A), respectively. 17, 18 and 19 are gate circuits connected to the photodiodes 4, 5 and 6 and to the bases and/or collectors of the transistors 8, 9 and 10. 20, 21 and 22 are resistors connected to the bases of the transistors 8, 9 and 10; 15, an ON-OFF switch; and 16, a power source.

The input terminals of the gate circuits 17, 18 and 19 are connected to the collectors of the transistors 8, 9 and 10 so that when the transistors 8, 9 and 10 are conducted their collector voltages drop and the gate circuits are turned off.

Next the mode of operation will be described. It is assumed that the light shielding disk which rotates in unison with the rotor of the DC motor intercept the light beam from the light source to the photodiode 5, permit the light beam to pass through a slit of the disk and fall upon the photodiode 6 and then permit the light beam to pass through the slit to fall on the photodiode 4. In response to the output of the photodiode 6 the current flows into the base of the transistor 8 so that the latter is conducted. As a result the driving current flows through the coil 11 so that the rotor is further accelerated and the slit of the light shielding disk permits the light beams from the light sources to fall upon both the photodiodes 6 and 4 simultaneously. The photodiode 4 therefore outputs the signal but the gate circuit 17 is closed because the transistor 8 has been conducted so that the output signal is not applied to the base of the transistor 9. When the rotor is further rotated so that the light-shielding disk interrupts the light beam from falling upon the photodiode 6 but permits the light beam to fall upon the photodiode 4, the transistor 8 is turned off so that the gate circuit 17 is opened. Therefore the output of the photodiode 4 is now applied to the base of the transistor 9 so that the latter is conducted. The driving current flows through the driving coil 12 so that the rotor is continuously driven and the light beam falls upon the photodiode 5. But the transistor 9 is conducted so that the gate circuit 18 is turned off or closed. Therefore the output of the photodiode 5 cannot be applied to the base of the transistor 10 so that the latter remains turned off. When the rotor is further driven so that the light beam is interrupted to fall upon the photodiode 4, the gate circuit 18 is opened so that the output of the photodiode 5 is now applied to the base of the transistor 10. Therefore the transistor 10 is conducted so that the driving current flows through the driving coil 13.

Therefore, as shown in FIG. 4(B) the driving currents which are sequentially applied to the driving coils 11, 12 and 13 will not be superposed one upon the other. In other words the driving current is applied to only one driving coil at one time so that the rotor may be driven with a uniform troque as shown at 4 in FIG. 4(B).

Figure 5:
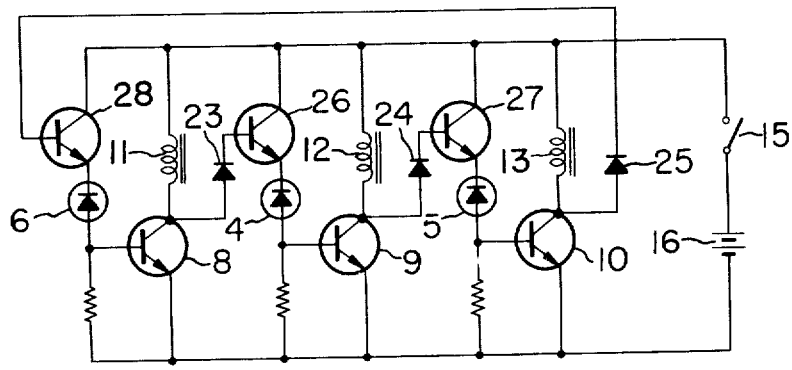
FIG. 5 is a diagram of a practical electronic control circuit of that shown in FIG. 4(A)
Figure 6:
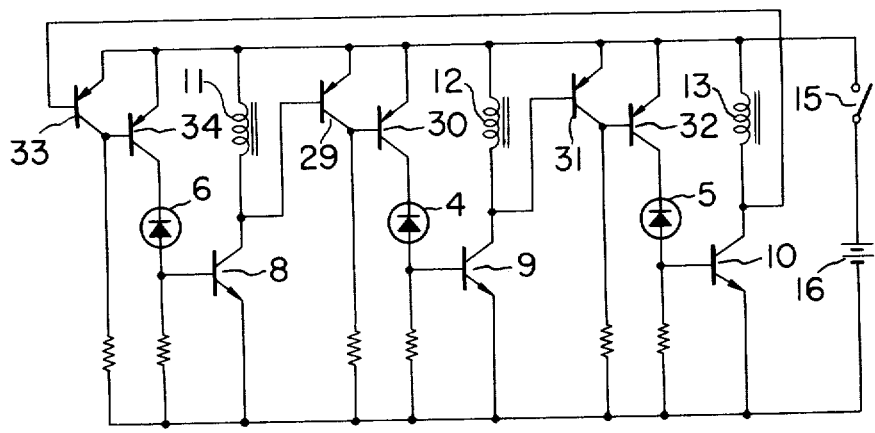
FIG. 6 is a diagram of a variation of the control circuit shown in FIG. 4(A)

The practical circuits of the gate circuits 17, 18 and 19 are illustrated in FIGS. 5 and 6. The gate circuits 17, 18 and 19 comprise diodes 23, 24 and 25 and gating transistors 26, 27 and 28 in the diagram shown in FIG. 5. The gate circuits function in a manner substantially similar to that described with reference to FIG. 4(A).

In the circuit arrangement shown in FIG. 6, each of the gate circuits comprises two transistors 33 and 34; 29 and 30 and 31 and 32. When the driving current flows through the preceding coil for example, driving coil 11 so that the transistor 8 is turned on, the transistor 29 in the gate circuit connected to the transistor 8 is turned on while the transistor 30 is turned off. Therefore even when the light beam in intercepted by the photodiode 4 in the next stage the transistor 9 remains turned off so that no driving current flows through the driving coil 12. However when the light beam is interrupted to fall upon the photodiode 6 in the preceding stage as the light-shielding disk rotates, the transistor 8 is turned off so that the gate circuit is opened. Now the output of the photodiode 4 is applied to the base of the transistor 9 so that the latter is turned on. As a result the driving current flows through the driving coil 12.

Figure 7:
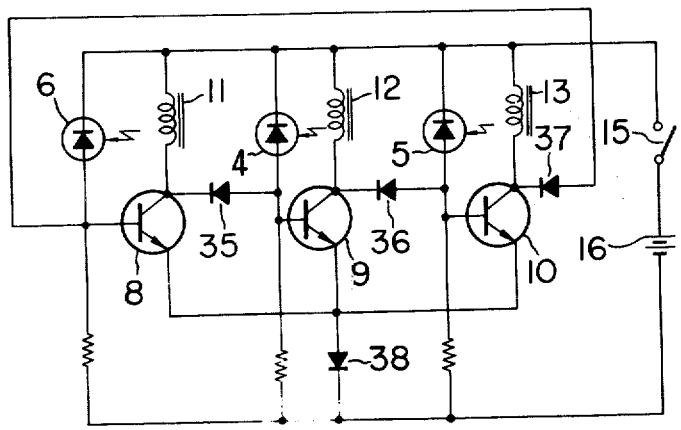
FIG. 7 is a diagram of a second embodiment of the present invention.
Figure 8:
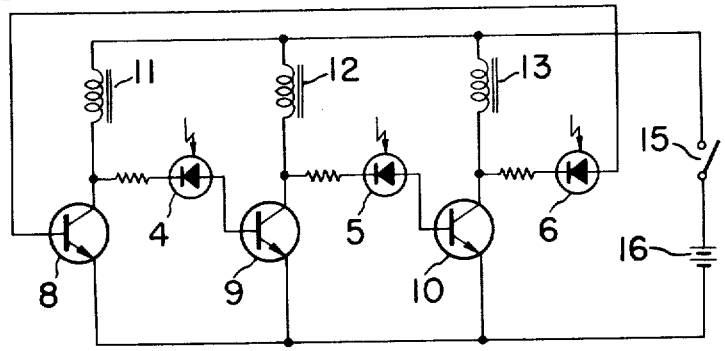
FIG. 8 is a diagram of third embodiment of the present invention.

In the second and third embodiments shown in FIGS. 7 and 8 the circuits are simplified. In FIG. 7 diodes 35, 36 and 37 are used to couple the output terminal of the control circuit to the input terminal thereof in the form of a link. A diode 38 is used to apply a common emitter voltage. When the light beams are intercepted by the photodiodes 4 and 5, the transistor 9 is turned on so that the driving current flows through the driving coil 12. The output of the photodiode 5 is applied to the common emitter circuit through the forward-connected diode 36 and the transistor 9, but the base potential of the transistor 10 remains unchanged so that the transistor 10 remains turned off. But when the light beam is interrupted to fall upon the photodiode 4, the transistor 9 is turned off so that the output of the photodiode 5 is now applied to the base of the transistor 10 so that the latter is turned on. Therefore the driving current flows through driving coil 13. Since the diode 36 is reverse-connected with respect to the output from the preceding stage, the output signal is not applied to the base of the transistor 10. The above operations are cycled so that the motor is continuously driven.

In the third embodiment shown in FIG. 8 the photodiodes 4, 5 and 6 are used to link the stages. When the light beams are intercepted by the photodiodes 4 and 5, the transistor 8 is turned off while the output of the photodiode 4 is applied to the transistor 9 so that the latter is turned on. As a result the driving current flows through the driving coil 12. When the transistor 9 is turned on, the output signal from the photodiode 5 is grounded to the common emitter circuit through the transistor 9 so that the transistor 10 remains turned off. When the light beam is interrupted to fall upon the photodiode 4, the transistor 9 is turned off while the transistor 10 in the next stage is turned on in response to the output signal from the photodiode 5. Therefore the driving current flows through the driving coil 13. The operations are cycled in the manner described above so that the motor is continuously driven. It will be understood that each photodiode interconnected between the stages serves to interrupt the output signal from the preceding stage from being applied to the next stage because of the diode action thereof when no light beam is intercepted by the photodiode.

So far the present invention has been described in such a manner that in response to the energization of one driving coil the supply of the driving current to the driving coil which has been energized is interrupted, but it will be understood that the arrangement is made in such a manner that in response to the interruption of the supply of the driving current to one driving coil the supply of the driving current to the next driving coil may be started.

In the above embodiments, the light sources and the photoelectric elements are disposed on both sides of the light shielding disk as shown in FIG. 1, but it will be understood that only one light source may be used with a plurality of photoelectric elements disposed therearound and a light-shielding disk or the like which has a slit extending through about 120° and is coupled and driven by the rotor. Instead of the photodiodes the phototransistors may be used as shown in FIG. 2.

Figure 9:
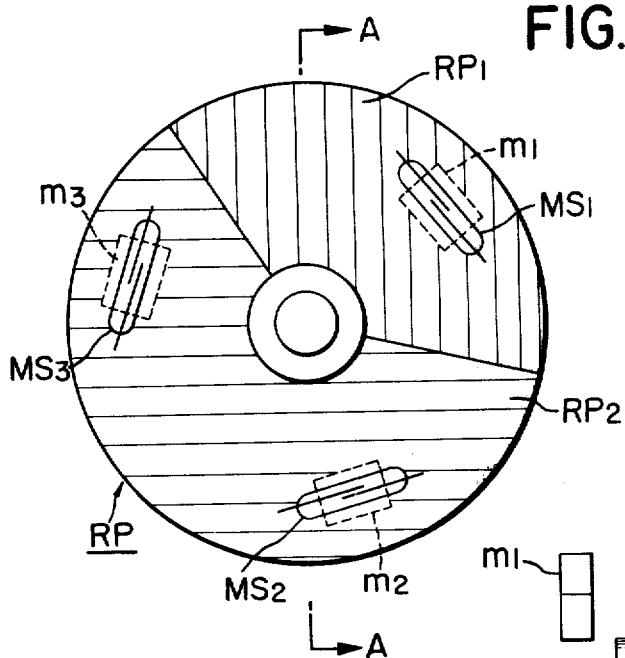
FIGS. 9(A) and 9(B) are front and side views of a device for detecting the angular position of the rotor in which magnet diodes are used instead of the photodiodes.
Figure 9:
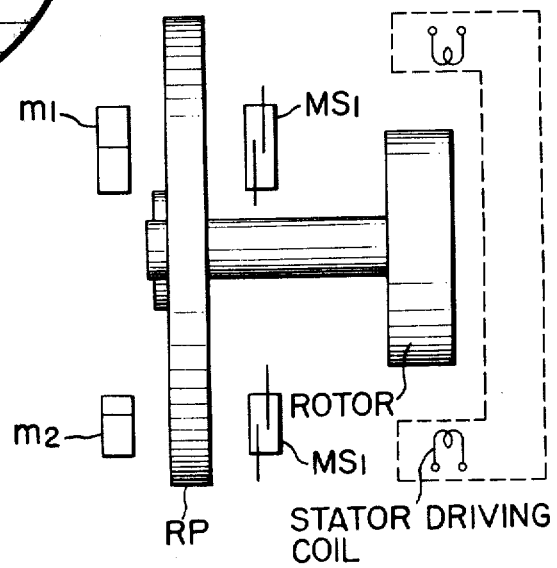

In the device for detecting the angular position of the rotor shown in FIG. 9, a rotary disk RP consisting of a segment of $(240° - \alpha°)$ made of a non-magnetic material and a segment of $(120° + \alpha°)$ is carried by the rotary shaft of the motor. Magnets $m_1$, $m_2$ and $m_3$ and magnet-sensitive elements as reed switches, magnet diodes or magnet-sensitive resistors $MS_1$, $MS_2$ and $MS_3$ are disposed in opposed relation instead of the light sources and the photoelectric elements shown in FIG. 1. The elements $MS_1$, $MS_2$ and $MS_3$ are connected in the control circuits described hereinbefore instead of the photodiodes.

Figure 10:
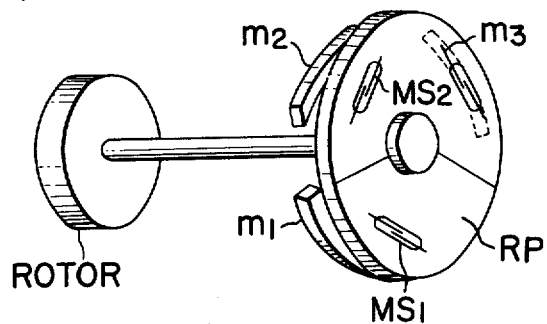
FIG. 10 is a perspective view of a variation thereof.

In the variation shown in FIG. 10, the magnets $m_1$, $m_2$ and $m_3$ are extended through $(120° + \alpha°)$ so that the switching operations of the magnetic-sensitive elements $MS_1$, $MS_2$ and $MS_3$ may be controlled with a higher degree of accuracy. In the embodiments described above the three driving coils are used, but when more than three driving coils are used the magnets $m$ and the magnetic-sensitive elements $MS$ must be of course equiangularly spaced apart by an angle less than 120°.

Figure 11:
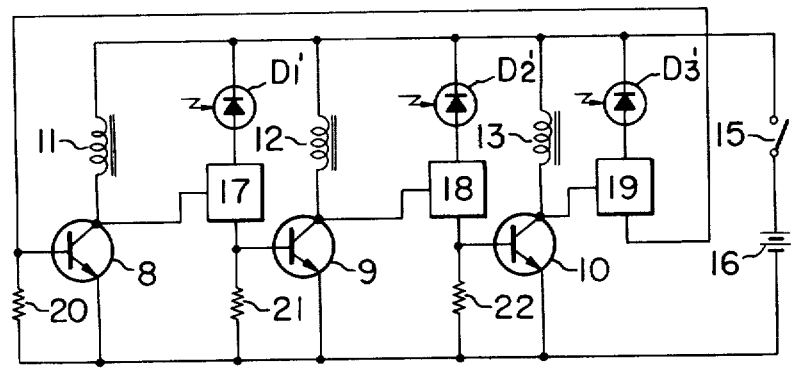
FIG. 11 is a diagram of a variation of the control circuit shown in FIG. 4(A)
Figure 12:
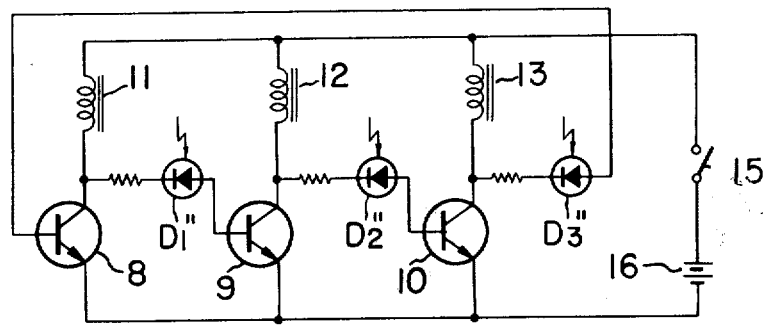
FIG. 12 is a diagram of a variation of the control circuit shown in FIG. 8.

The control circuits employing the magnetic-sensitive elements such as magnet diodes $D_1$, $D_2$ and $D_3$ and $D''_1$, $D''_2$ and $D''_3$ are shown in FIGS. 10 and 11 and are substantially similar to those illustrated in FIGS. 4(A) and 8 except that the magnet diodes are used instead of the photodiodes. The modes of operation are also similar so that no further description will be made.

As described above according to the present invention the energization of the driving coils which produce a rotary magnetic field is controlled depending upon whether or not the other driving coils are energized so that the uniform driving currents may be supplied to all of the driving coils. By only adding some circuit components to the conventional brushless DC motors, the present invention may provide improved brushless DC motors with a uniform speed, a uniform torque and improved starting characteristics.

I claim:
1. A control circuit for an electric motor having a plurality of driving coils and a rotor driven by the successive energization of said coils, said control circuit comprising:
   a plurality of switching means, each arranged to control the energization of a different one of said coils,
   a plurality of tranducers, each arranged to produce output control signals for actuation of an associated one of said switching means during the turning of said rotor through a different sector, said transducers being arranged such that their respective control signal producing sectors overlap whereby, at different intervals of rotor movement, output control signals are produced simultaneously by two transducers whose switching means produce successive coil energization,
   and gating means having two inputs connected respectively to receive signals indicative of the outputs of each of said two transducers to prevent actuation of the switching means associated with one of said two transducers in response to control signal outputs from the other of said two transducers, said gating means having an output connected to the switching means associated with said one transducer to permit actuation of said switching means by control signal outputs from said one transducer in the absence of control signal outputs from said other transducer whereby a uniform and continuous energization, in succession, of said coils is presented to said rotor.

2. A control circuit according to claim 1 wherein said gating means comprises a plurality of gates, each gate input of which is respectively connected to an output of a preceding one of said switching means and each gate output of which is respectively connected to an input of a corresponding one of said switching means.

3. A control circuit according to claim 2 wherein each said gate comprises a transistor and a diode connected to the input of said transistor.

4. A control circuit according to claim 2 wherein each said gate comprises a pair of transistors connected in cascade.

5. A control circuit according to claim 1 wherein said gating means comprises a plurality of diodes each connecting a corresponding one of said transducer means with an output of a preceding one of said switching means.

6. A control circuit according to claim 1 wherein said switching means are switching transistors having a common bias resistor and said gating means comprises a plurality of lead means each including one of said transducer means interposed between an input of one switching transistor and an output of other switching transistor.

7. A control circuit for a brushless DC motor in which a permanent magnet rotor rotates in response to a rotating magnetic field established by individual stator windings disposed and wound around the rotor so as to attract a selected one of magnetic poles of the rotor, each of the stator windings being connected to a corresponding one of switching means which is turned on by a control signal generated by associated transducer means, associated transducer enabling means rotatable in response to the rotation of the rotor to produce one control signal in one phase for energizing one of the coils and at least two control signals in another phase for energizing associated coils, means for turning on only a next succeeding one of the switching means to energize the corresponding one of the driving coils, the turning on means comprising a plurality of gate means each having one input connected to an output of an associated one of the transducer means, another input connected to the output of another switching means and an output connected to an input of and associated one of the switching means.

8. A control circuit according to claim 7, wherein each of the gate means comprises a switching element.

9. A control circuit according to claim 8, wherein each of the transducer means is interposed between each of the switching means and the switching element.

10. A control circuit according to claim 7, wherein each of the gate means comprises a switching transistor and a diode connected to an input of the switching transistor, and the transistor being connected to an input of an associated one of the switching means.

11. A control circuit according to claim 7, wherein each of the gate means comprises two transistors connected in cascade.

12. A control circuit according to claim 7, wherein each of the gate means comprises a diode having an input connected to an output of a preceding one of the switching means and an output connected to an input of a next succeeding one of the switching means.

* * * * *